United States Patent [19]

Spinosa et al.

[11] Patent Number: 4,496,271
[45] Date of Patent: Jan. 29, 1985

[54] RESTRAINING FITTINGS

[75] Inventors: Dominic J. Spinosa, Wantagh; Frank Knoll, Huntington Station, both of N.Y.

[73] Assignee: East/West Industries, Inc., Farmingdale, N.Y.

[21] Appl. No.: 431,837

[22] Filed: Sep. 30, 1982

[51] Int. Cl.³ .............................................. B60P 7/08
[52] U.S. Cl. ................................ 410/105; 248/503.1; 410/8
[58] Field of Search ...................................... 410/8–12, 410/74, 75, 104, 105, 115; 248/500, 503, 503.1; 244/118.1, 118.6; 297/15, 311

[56] References Cited

U.S. PATENT DOCUMENTS

| 3,282,229 | 11/1966 | Elsner | 410/105 |
| 3,605,637 | 9/1971 | Prete, Jr. | 410/105 |
| 4,047,689 | 9/1977 | Grendahl | 410/105 |
| 4,062,298 | 12/1977 | Weik | 248/503 X |
| 4,185,799 | 1/1980 | Richards, Jr. | 410/105 X |

Primary Examiner—Randolph Reese
Attorney, Agent, or Firm—Leonard W. Suroff

[57] ABSTRACT

A restraining fitting suitable for use with a mating track member affixed to a flat surface includes an upper portion having a ring affixed thereon suitable for receiving restraining straps or, alternatively, may include a bracket for receiving other mechanisms such as seat legs, shelves, etc., on its upper surface. The lower portion includes depending protrusions adapted to be received into and cooperate with bore holes provided in the track member. A lower member formed to be slidably retained by the upper member provides displacement of the depending protrusions locking the restraining fitting in the mating track member without requiring movement of the upper member from its initial position.

20 Claims, 12 Drawing Figures

RESTRAINING FITTINGS

BACKGROUND OF THE INVENTION

1. Field of the Invention

The present invention relates to hold-down or restraining fittings and, in particular, relates to a restraining fitting and a cooperating track member that does not require displacement of the restraining fitting on the device affixed thereto once inserted in the track member for retainment.

2. Discussion of the Relevant Art

Many different types of restraining devices, e.g. tie-down devices, hold-down fittings and tracks and/or anchors are in use today on aircraft to convert their internal carrying space from passenger seats to cargo bays in order to meet the varying demands of customers. The ideal type of restraining or hold-down device should be flexible and easily removable so that conversion from a cargo hold-down arrangement to placement of passenger seats can be made with ease. Various types of mechanisms, devices, shelving, chairs, etc. are required to be installed and removed as necessary. In devices utilized at the present time, it frequently becomes necessary and is convenient to use a track member which is permanently affixed to the floor, wall and-/or ceiling of the interior carrying space.

Although the discussion herein is generally related to changes in aircraft interiors, the restraining fittings disclosed herein are ideally suitable for use in other types of vehicles such as automobiles, vans, ships, etc. Various types of permanent tracks or anchors have been utilized over the years. A track provided with a longitudinal undercut channel and a plurality of bore holes is one of the most popular in use today. This type of track permits many different types of restraining devices to be inserted into the bore holes provided. The devices are moved in the undercut channel and, thereby, are restrained from removal from the track because a portion of the restraining device is disposed beneath the undercut channel lip. This approach has been found to be successful because very little restrictions are place on the installation of the track and the track is suitable for receiving any number of different types of restraining fittings, anchors, or hold-down devices, etc which may be used in conjunction with tie-down straps, webbing, etc.

One of the shortcomings of the devices presently in use requires that the hold down device be inserted into the bore holes provided in the longitudinal undercut channel provided in the track and then moved to the area between bore holes in order to be captured by the lip of the undercut channel. This requires that once an object, such as a chair having its legs or mounting associated therewith, is positioned for installation by inserting its mounting into a cooperating bore hole, it must be moved to place it in a restrained position. Generally, there is no visual indication when the object (chair) is moved to the restrained or locked position or that it may be removed by exerting an upwardly directed force. This may cause numerous problems because installation personnel may forget to move the object to its locked position and, therefore, the object is free to come loose vibration or when vertical forces are exerted upon it. Additional time, care and inspection is required to insure that the installation of the restraining devices have been made properly. Moreover, a positive lock is not provided when the object has been placed in its restrained position, nor is there a visual indication that the restrained position has been accomplished.

The instant invention overcomes the known shortcomings and provides a relatively simple means to accomplish a positive lock to an object once installed in a mating track, provides a visual indication when the lock has been accomplished and, furthermore, does not require that an object, once inserted in the track, be moved in order to obtain its restrained position.

SUMMARY OF THE INVENTION

Therefore, it is an object of the present invention to provide a reliable restraining fitting which may be easily installable in a cooperating track.

It is another object of the present invention to provide a restraining fitting suitable for numerous applications with ease of installation and positive locking.

It is a further object of the present invention to provide a restraining fitting which, when installed into a mating track and locked into position, will provide a visual indication to an observer with a cursory review.

It is yet another object of the present invention to provide a restraining fitting suitable for use with a mating track that provides a positive detent when it is in its locked position and, furthermore, requires a release to be changed from the locked to the unlocked position.

It is yet another object of the present invention to provide a restraining fitting suitable for use with objects to be affixed to a mating track which may be positioned upon installation and not moved to provide a locking or restraining mode.

The foregoing and other objects and advantages will appear from the description to follow. In the description, reference is made to the accompanying drawing which forms a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. The following detailed description is, therefore, not to be taken in a limiting sense, and the scope of the present invention is best defined by the appended claims.

BRIEF DESCRIPTION OF THE DRAWINGS

In order that the invention may be more fully understood, it will now be described, by way of example, with reference to the accompanying drawing in which.

DESCRIPTION OF THE PREFERRED EMBODIMENTS

Figure 1:
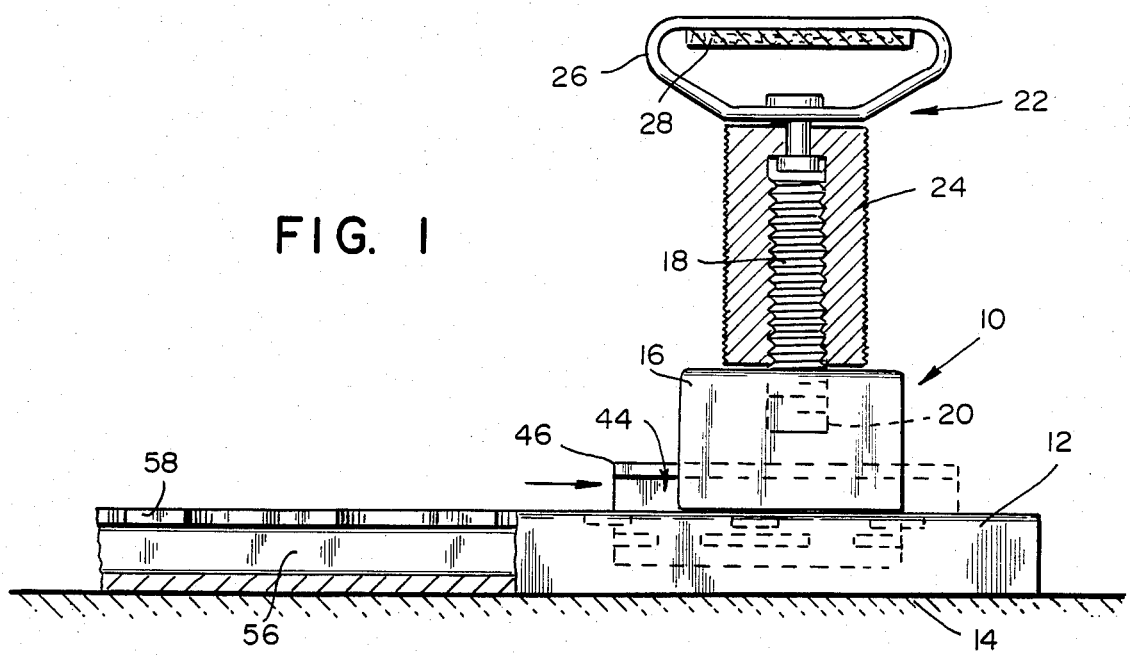
FIG. 1 is a side view, in elevation, partially broken away, of a restraining fitting in its unlocked posision, according to the principles of the instant invention, and inserted in a mating or cooperating track member.

Referring now to the figures, and in particular to FIGS. 1, 2, 3 and 4, there is shown a restraining fitting 10 disposed in a mating or cooperating track 12 which may be affixed to any flat surface in or on a vehicle such as an airplane, automobile, ship, etc. The upper member 16 of the restraining fitting 10 is provided with a restraining device such as stud 18 adapted to be received into a threaded aperture 20 provided in the top of upper member 16. Although a threaded stud 18 is shown in the preferred embodiment, it is well known by those knowledgeable in the art that upper member 16 may be formed directly with other types of restraining devices as an integral part thereof. Threaded stud 18 may then receive a ring device 22 which has a lower threaded portion 24 that cooperates with threaded stud 18 and, when tightened in position, permits the swivel ring 26 to accept a tie-down belt or webbing 28 therein for the purpose of holding down cargo or other items to the surface 14, as will be explained hereinafter.

The upper member 16 is provided with a T-shaped channel 30 disposed longitudinally and a plurality of downwardly depending, spaced apart, cylindrically shaped protrusions 32 and 34. Protrusion 32 is cut in half merely for convenience in explaining the operation of the present embodiment. It is to be understood that a plurality of these protrusions are to be utilized and they will be spaced preferably so that the distance between centers of the protrusions is equal to the diameter of the protrusions. The number of protrusions employed depends upon the length of the upper member utilized and the forces that they are to restrain and, of course, are to be considered in the design of an overall system. The height of the protrusion 32 and 34 is preferably equal to or slightly greater than the scalloped lip portion 36 provided by the undercut channel 56 on the mating or cooperating track member 12 and the diameter of the protrusions 32 and 34 should be slightly less than the diameter provided in the bore holes 38, 40, and 42 provided in the track 12. Although circularly shaped protrusions and bore holes are preferred, any mating shapes or configurations may be utilized.

A lower member 44 is provided with a T-shaped portion 46 that is designed to be slidably retained within the T-shaped channel 30 provided in the upper portion 16. The lower portion 48 of the lower member 44 is provided at the distal end thereof with a series of circularly-shaped protrusions 50, 52 and 54 having a diameter essentially equal to the diameter of protrusions 32 and 34 provided on the underside of upper member 16. The height of protrusions 50, 52 and 54 is slightly less than the longitudinal undercut inverted T-shaped channel 56 provided in track 12 with which it is to cooperate as will be explained hereinafter. The lower portion 48 extends longitudinally and protrusions 50, 52 and 54 are spaced thereon in the same manner as protrusions 32 and 34 are spaced on upper member 16. The number of protrusions provided here again are determined in the same manner as protrusions 32 and 34 were determined. Although protrusions 50 and 54 have been cut in half for convenience, it is understood that a plurality of preferably circularly shaped protrusions as shown in 52 are to be included. Lower portion 48 extends through the channel opening 58 provided in channel 56 and in channel opening 60 provided in channel 30 in the upper member 16, thereby providing a severing of protrusions 32 and 34 into segments which is shown in FIG. 3.

Track member 12 is provided with mounting holes 62, 64, 66 and 68 into which are inserted screws or rivets 70, 72, 74 and 76 in order to affix the track member 12 to any flat surface. The number of mounting holes utilized and the screw size to be utilized depends upon the load to be restrained and is a matter of design choice. The apertures 38, 40 and 42 are slightly larger in diameter than the diameter of the protrusions 32 and 34 and protrusions 50, 52 and 54. Protrusions 32 and 34, when received by the apertures 38, 40 and 42, maintain the upper member in position, preventing any movement in the longitudinal direction and by movement of the lower member 44 in the direction of arrow 80, causing displacement of protrusions 52 from 34 and 50 from 32 will restrain the upper member from being removed from the track 12 since protrusions 50 and 52 will engage the lip portion 36 provided in the track 12, as is shown in FIG. 3. Movement of lower member 44 in the direction of arrow 82 will cause alignment of protrusions 34 and 52, 32 and 50, thereby permitting the upper member 16 to be removed together with the lower member 44 from the track 12. The position of the protrusions is clearly shown by comparing FIG. 2 to FIG. 3 and their location relative to the cooperating track 12.

Figure 2:
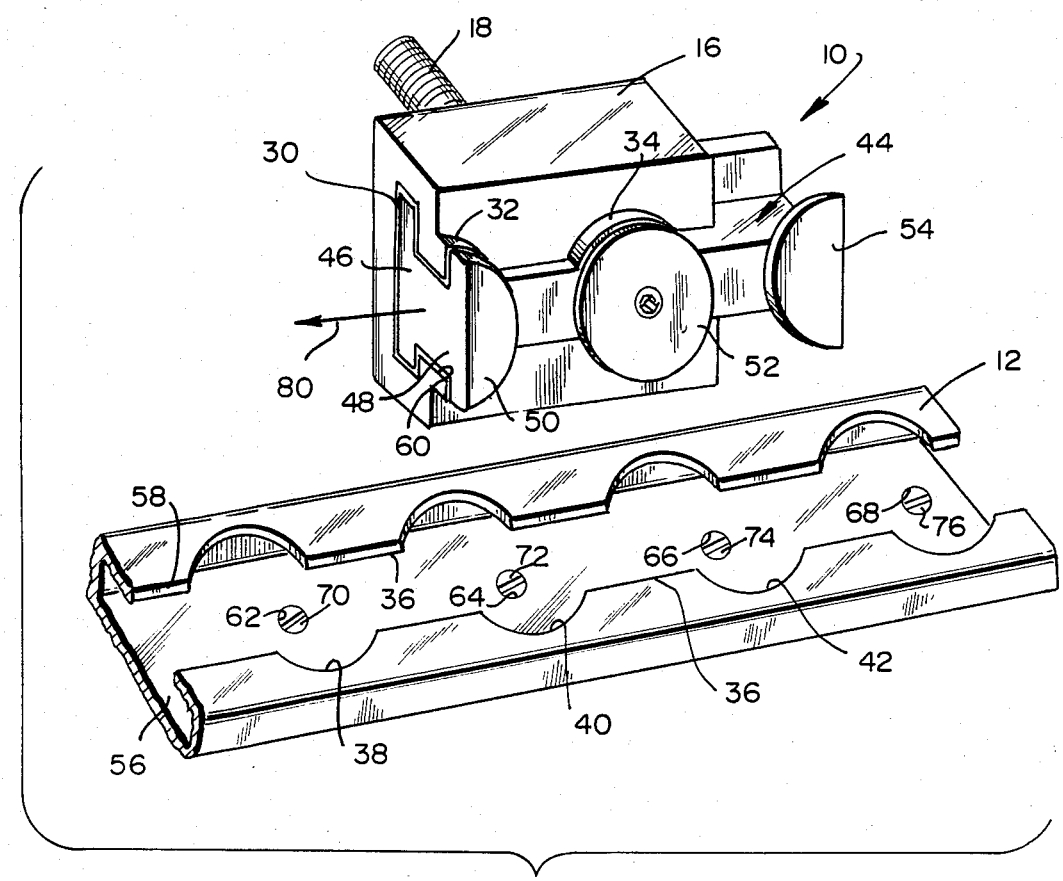
FIG. 2 is an isometric exploded view of the restraining fitting in its unlocked position just prior to insertion into a cooperating track.
Figure 3:
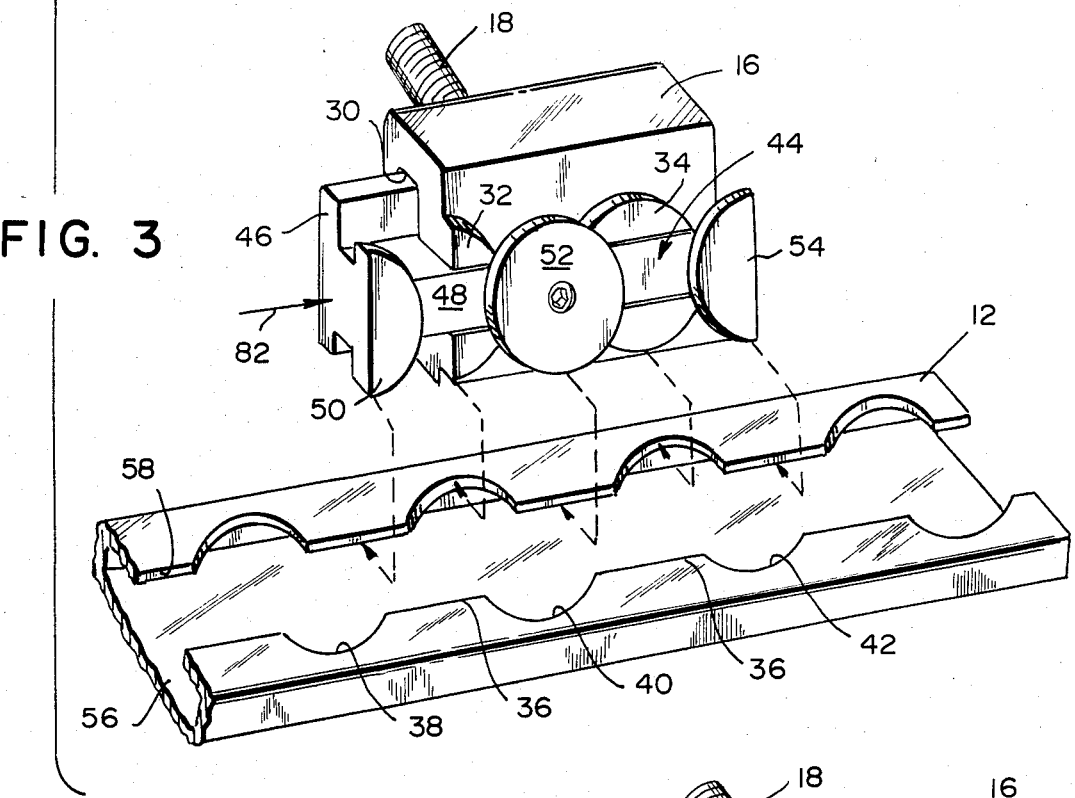
FIG. 3 is an isometric exploded view of the restraining fitting shown in FIG. 2 with the protrusion disposed in the locked position.
Figure 4:
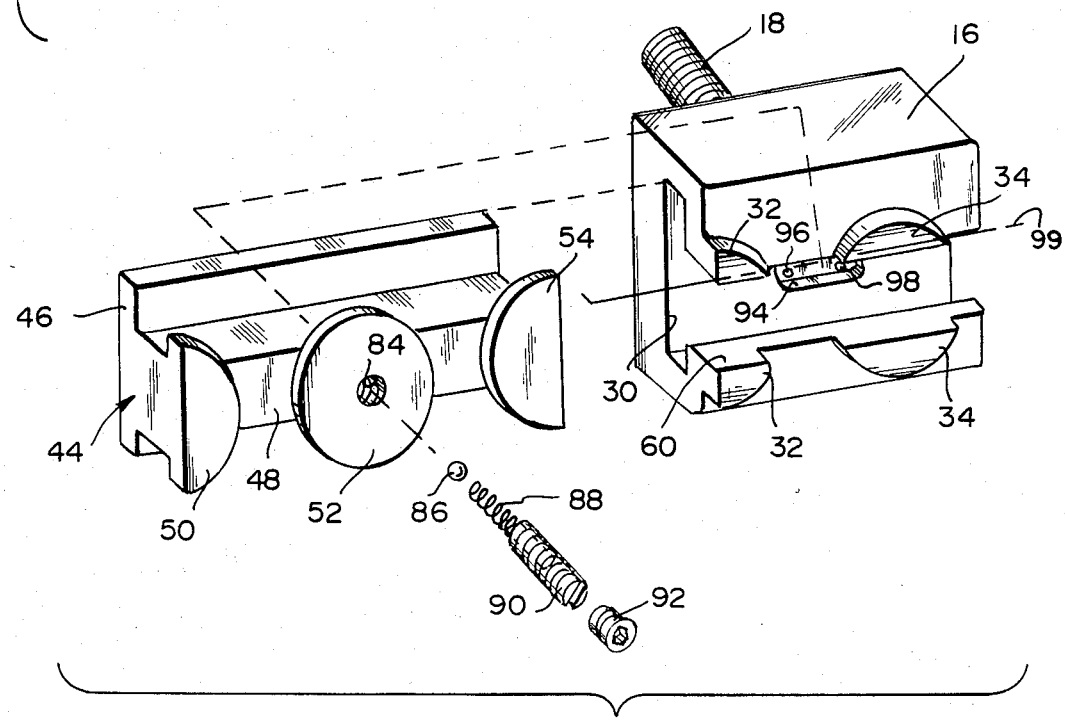
FIG. 4 is an exploded isometric view showing the detent mechanism utilized in the embodiment disclosed in FIGS. 1, 2, and 3.

Referring now to FIG. 4, there is shown an exploded view of the upper member 16 and the lower member 44 which is received therein, including the mechanical arrangement for the detent mechanism which provides for a positive indexing of the lower member 44 when it is moved from the locked position, in the direction of arrow 82, to the unlocked position shown in FIG. 2 and conversely when it is moved in the direction of arrow 80 to return to the locked position as shown in FIG. 3. Preferably, a threaded aperture 84 is centrally disposed in protrusion 52 entering and going clear through the lower member 44, perpendicular to the longitudinal axis thereof. The threaded aperture 84 has inserted therein a detent ball 86, a coil spring 88 and headless screw 90 which is utilized to set the pressure on the detent ball 86. Preferably a set screw 92 is utilized to maintain screw 90 in position and prevent it from working loose under vibration conditions.

An elongated bore hole 94 is provided in the upper portion of channel 30. Bore 94 is provided with two detent depressions 96 and 98 into which detent ball 86 enters, indexing the locked and unlocked position when lower member 44 is moved or translated along the longitudinal axis 99 of the lower member 44. Thus, once upper member 16 has been positioned on track 12, it remains in position and lower member 44 is the mechanism that affects the locking of the restraining fitting 10.

Figure 5:
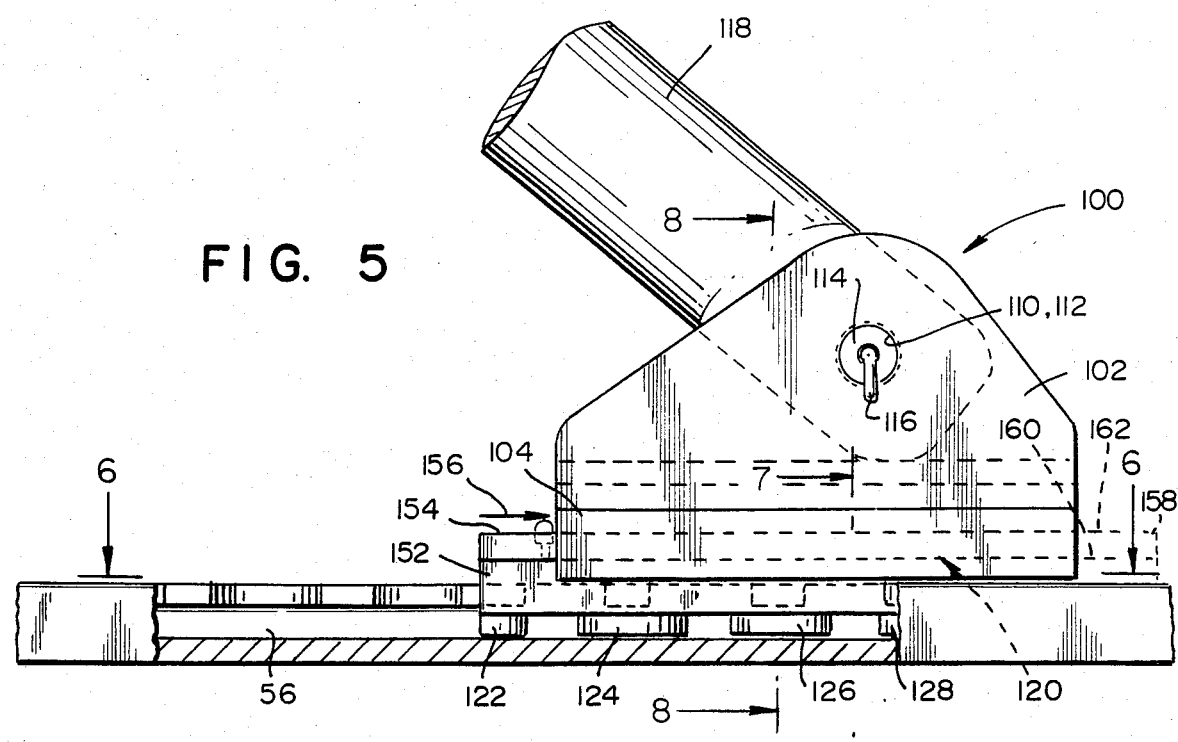
FIG. 5 is a side view, in elevation, partially broken away of an alternative embodiment of a restraining fitting, according to the principles of the present invention, inserted in a mating track member.
Figure 7:
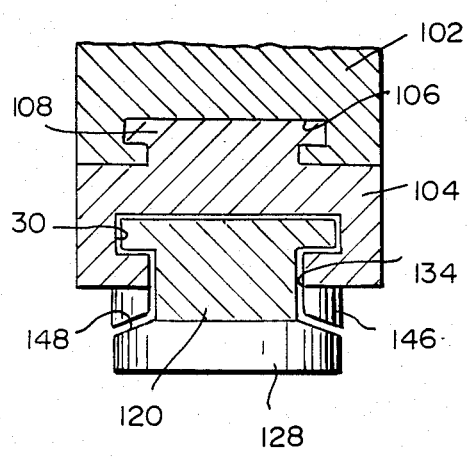
FIG. 7 is a cross-sectional view taken along the line 7—7 of FIG. 5.

Referring now to FIG. 5, wherein there is shown an alternative embodiment 100 of a restraining fitting which has its upper portion fabricated from two members 102 and 104, having a mating T-shaped channel 106 and protrusion 108 rigidly held together by conventional force fit techniques (see FIG. 7). Member 102 is preferably U-shaped and provided with a pair of apertures 110 and 112 into which a retaining pin 114 may be inserted. Retaining pin 114 is provided with a locking arm 116 to prevent inadvertent removal of the pin once placed in position to retain a device such as the leg of a chair 118 which may be provided with a corresponding aperture to align with apertures 110 and 112 or may receive the vertical portion of a shelf, or any other device, which is to be held in position. It is to be understood that although members 102 and 104 are shown as two separate pieces, they may be integrally formed and may also be fabricated as an integral part of chair leg 118 or any other device that is to be restrained. Member 102 may be fabricated together with member 104 in an infinite variety of assemblies which may be specifically adapted to the articles to be restrained.

Figure 6:
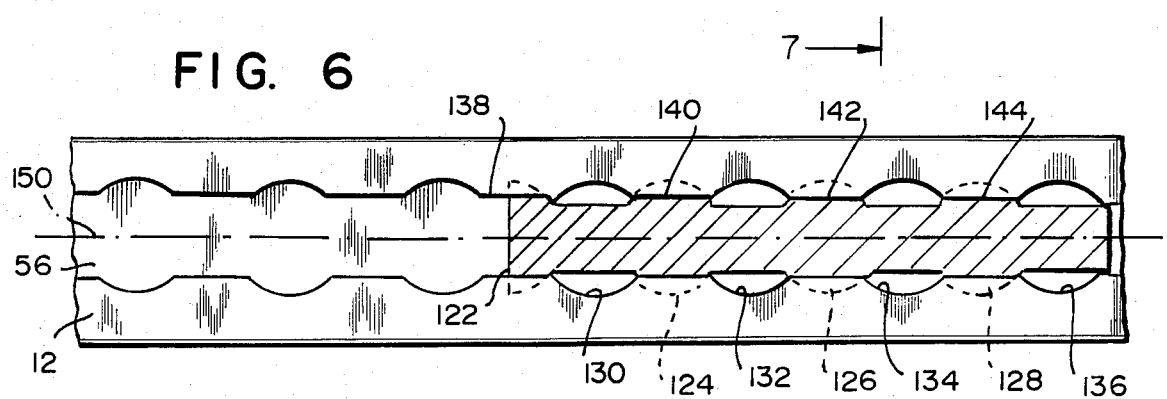
FIG. 6 is a top plan view taken along the line 6—6 of FIG. 5.

The lower or sliding member 120 of restraining fitting 100 is fabricated identical to the lower member 44 as described in conjunction with the embodiment disclosed in FIGS. 1 through 4. The only exception being that additional protrusions are incorporated herein since the restraining member 100 is larger in size and is suitable for restraining heavier loads. These protrusions 122, 124, 126, and 128 are shown in their locked position in FIG. 5. FIG. 6 shows a top plan view of the protrusions relative to apertures 130, 132, 134, and 136. The protrusions 122, 124, 126 and 128 are displaced relative to apertures 130, 132, 134 and 136 so that the lip portions 138, 140, 142 and 144 of track 12 prevent the removing of the restraining fitting 100 from the track 12 in this position, while protrusions 146 (see FIG. 7) positioned in each of the apertures 130, 132, 134 and 136 prevent lateral or longitudinal movement of the restraining fitting along longitudinal axis 150.

In order to provide ease in movement of the lower or sliding member 120, the protrusions provided on the underside thereof are sloped in an upwardly direction toward the longitudinal axis as shown in FIG. 7 and the cooperating upper surface 148 of protrusion 128 is also provided with a sloping surface, sloping downwardly away from the longitudinal axis to further reduce any frictional engagement between the two surfaces.

As shown in FIG. 5, the lower or sliding member 120 is provided with an extending portion 152 which is readily accessible to an individual who is to change the position of the sliding member from its unlocked to its locked state. The upper surface 154 (shown in FIG. 5) of the extending portion 152 may be provided with indicia thereon such as, for example, the word "locked" and a color, for example, green, making it apparent, with merely a cursory review, the state of the restraining fitting 100. When moved from the position shown in FIG. 5 in the direction of arrow 156, the sliding member 120 will be moved to the position shown by dotted line 158 whereupon the extending portion 160 may be provided on the surface 162 with indicia thereon such as "unlocked" and be colored red, so that a cursory review thereof will readily indicate this condition.

Figure 8:
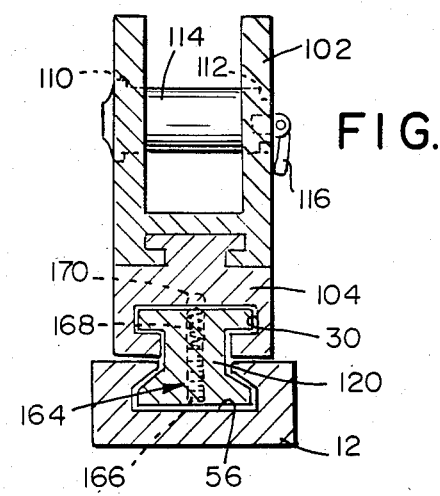
FIG. 8 is a cross-sectional view taken along the line 8—8 of FIG. 5.

A detent mechanism such as that described in conjunction with the embodiment disclosed in FIG. 4 may also be incorporated herein to provide a positive indication when the slide 120 is moved from the locked to the unlocked position. The detent mechanism 164 is shown in FIG. 8 and includes a set screw 166, spring 168, and detent ball 170.

Figure 9:
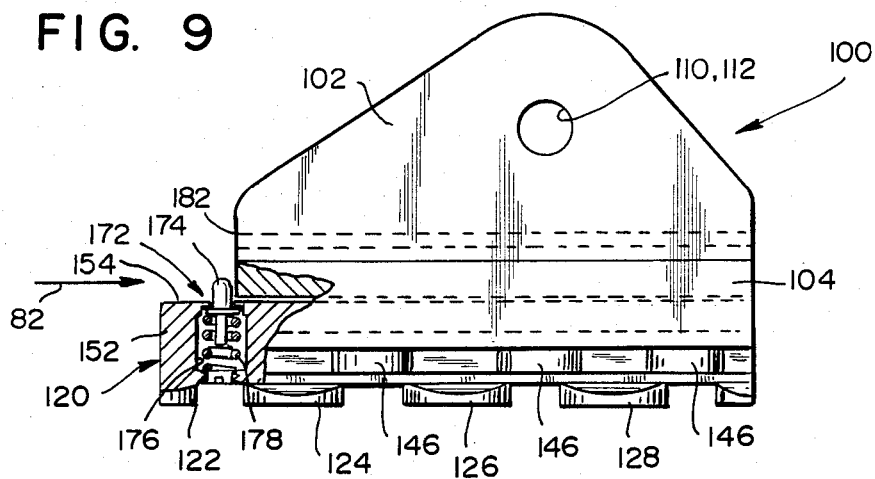
FIG. 9 is a side view, in elevation, of the embodiment disclosed in FIG. 5, partially broken away, indicating a positive locking mechanism.

Referring now to FIG. 9, there is shown a locking device 172 provided in the extending portion 152 of the lower or sliding member 120. As shown in FIG. 9, the restraining fitting 100 is in its locked position and, therefore, a spring loaded plunger 174 protrudes from a bore hole 176 provided in sliding member 120. A spring 178 urges the plunger 174 upwardly and is retained by a shoulder provided in the bore hole 176. Spring 178 is retained in the bore hole by a set screw 180, of the conventional type. Thus, when the sliding member 120 is in its locked position, the plunger 174 protrudes upwardly and comes into contact with the edge 182 of member 104 thereby preventing any movement of sliding member 120 in the direction of arrow 82 and preventing any unintentional movement from the locked to the unlocked position. Should it be desirable to unlock the restraining fitting 100, an individual will be required to depress plunger 174 beneath the surface 154 of the sliding member 120 and then exert pressure in the direction of arrow 82. A similar locking mechanism may be provided on the opposite end of sliding member 120 retaining the sliding member 120 in its unlocked position until released in the same manner.

Figure 10:
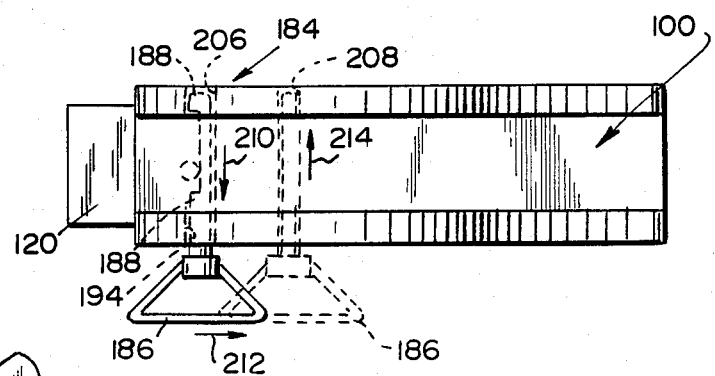
FIG. 10 is a top plan view of an alternative embodiment of a detent locking mechanism.
Figure 11:
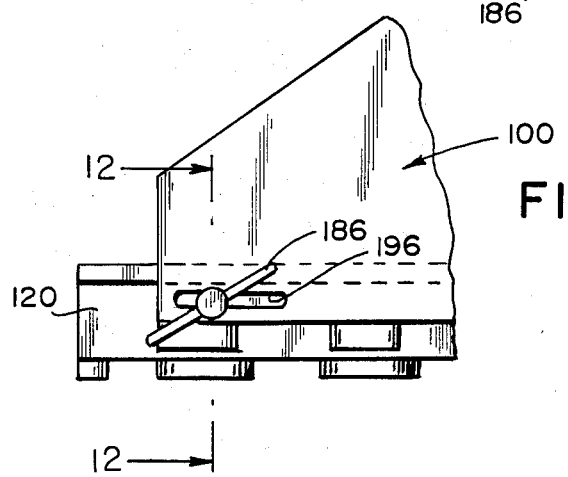
FIG. 11 is a partial side view, in elevation, of the mechanism disclosed in FIG. 10.
Figure 12:
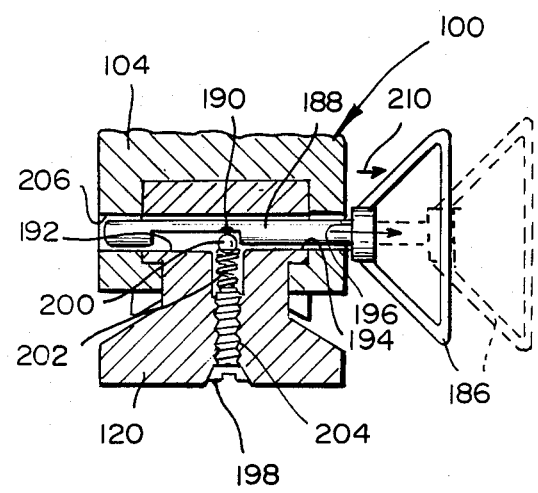
FIG. 12 is a cross-sectional view taken along the line 12—12 of FIG. 11.

An alternative locking mechanism 184 is disclosed in FIGS. 10, 11 and 12. Mechanism 184 includes a ring pull member 186 which is affixed to the distal end of a locking pin 188 which is provided with a detent groove 190 that is part of a slot 192 provided proximate the other end thereof. Pin 188 is received by an aperture 194 provided in the sliding member 120 which is positioned to coincide with a slotted groove 196 provided in member 104. The sliding member 120 is also provided with a spring loaded detent mechanism 198 which is seen to include a detent ball 200, spring 202 and set screw 204 which is positioned transverse to the pin 188. Since aperture 196 is an elongated groove, the sliding member may move freely from the locked to the unlocked position, however, on the far side of member 104, only two holes 206 and 208 are provided (see FIG. 10). These holes are adapted to receive the distal end of pin 188 when in either the locked or the unlocked position and, therefore, inadvertent movement from one position to the other is prevented. As shown in FIG. 10, ring pull 186 is pulled in the direction of arrow 210 to remove pin 188 from hole 206. The sliding member 120 may then be moved to the unlocked position in the direction of arrow 212 taking with it pin 188. When the unlocked position is reached, pin 188 may be pushed in the direction of arrow 214 causing pin 188 to be received by hole 208, thereby locking the restraining fitting 100 in the unlocked position.

Thus, as has been explained hereinbefore, a restraining fitting which may be positioned to cooperate with a mating track member, may be held onto the track member by the translation or movement of a sliding member and locked in position with ease, providing a visual indication of the position in which the device is disposed.

It is contemplated that the track member be fabricated in bulk and cut to specified lengths. The restraining portions may be fabricated in different modular constructions to cooperate with the track members, thereby permitting the invention to be utilized in numerous configurations for different applications.

Hereinbefore has been disclosed a simple, efficient, reliable, restraining fitting that may be utilized for a multitude of hold-down applications. It will be understood that various changes in the details, materials, arrangement of parts and operating conditions which have been herein described and illustrated in order to explain the nature of the invention may be made by those skilled in the art within the principles and scope of the instant invention.

Having thus set forth the nature of the invention, what is claimed is:

1. A restraining fitting suitable for use with a mating track member having a plurality of bore holes provided in a longitudinal undercut channel, comprising:
   (A) an upper member having a lower surface, upper surface and a restraining means provided, thereon, said lower surface of said upper member being provided with;
       (a) channel means, and
       (b) downwardly depending spaced apart protrusions formed to cooperate with and be received by said track member bore holes; and
   (B) a lower member having an upper surface formed to be slidably retained by said upper member channel means and cooperate therewith, said lower member being provided with;
       (a) a lower surface having a plurality of downwardly depending spaced apart protrusions positioned to extend beyond and to coincide with said depending protrusions provided on said lower surface of said upper member in a first position and to be displaced therefrom when moved to a second position.

2. A restraining fitting according to claim 1 wherein said restraining means is an integral part of said upper member.

3. A restaining fitting according to claim 1 wherein said restraining means is threaded into a mating threaded hole provided on said upper member.

4. A restraining fitting according to claim 1 wherein said restraining means is provided with a T-shaped channel provided on the underside thereof formed to cooperate with and be retained by a T-shaped extending portion provided on said upper surface of said upper member.

5. A restraining fitting according to claims 1,2,3, or 4 wherein said restraining means is a ring shaped member.

6. A restraining fitting according to claim 1,2,3, or 4 wherein said restraining means includes a U-shaped portion having apertures provided in the extending arms thereof adapted to receive a member to be restrained therein and a retaining pin adapted to be inserted into and cooperate with said arm apertures and an aperture provided in said restrained member.

7. A restraining fitting according to claim 1 wherein said upper member channel means is generally T-shaped when viewed on end.

8. A restraining fitting according to claim 1 wherein said upper member downwardly depending spaced apart protrusions are cylindrically-shaped and the spacings therebetween are approximately equal to the diameter of the protrusion.

9. A restraining fitting according to claim 8 wherein said lower surface of said upper member protrusions when viewed in cross-section are sloped upwardly towards the longitudinal axis of said channel means.

10. A restraining fitting according to claim 9 wherein the upper surface of said lower member extending protrusions are shaped to cooperate with the sloped lower surface of said upper member protrusions for ease in movement within said track channel.

11. A restraining fitting according to claim 1 further including detent means for providing a positive indication when said lower member is in said first and said second positions.

12. A restraining fitting according to claims 1 or 11 further including means for indicating when said lower member is in said first or said second position.

13. A restraining fitting according to claim 12 wherein said means for indicating said positions includes different colored extending tabs.

14. A restraining fitting according to claim 12 wherein said means for indicating said positions includes indicia.

15. A restraining fitting according to claim 11 wherein said detent means includes a transverse spring loaded pin and an aperture provided in said upper member channel means.

16. A restraining fitting according to claims 1 or 11 further including means for locking said lower member in said first and said second position.

17. A restraining apparatus comprising:
   (A) a longitudinal track member having;
       (a) a longitudinal undercut channel,
       (b) a plurality of bore holes provided in said channel, and
       (c) means for affixing said track to a flat surface; and
   (B) a restraining fitting for use with said track member including;
       (a) an upper member having a lower surface, an upper surface and a restraining means provided thereon, said lower surface of said upper member being provided with;
           (i) channel means, and
           (ii) downwardly depending spaced apart protrusions formed to cooperate with and be received by said track bore holes, and
       (b) a lower member having an upper surface formed to be slidably retained by said upper member channel means and cooperate therewith, said lower member being provided with;
           (i) a lower surface having a plurality of downwardly depending spaced apart protrusions positioned to extend beyond and to coincide with said depending protrusions provided on said lower surface of said upper member in a first position and to be displaced therefrom when moved to a second position.

18. A restraining apparatus according to claim 17 further including detent means for providing positive indication when said lower member is in said first and said second positions.

19. A restraining apparatus according to claims 1 or 17 further including locking means for locking said lower member in said first position.

20. A restraining apparatus according to claim 17 further including means for indicating when said lower member is in said first and in said second position.

* * * * *